United States Patent
Hiraoka

(10) Patent No.: US 9,777,095 B2
(45) Date of Patent: *Oct. 3, 2017

(54) PHOTOPOLYMERIZABLE COMPOSITION, PHOTOPOLYMERIZABLE INKJET INK, AND INK CARTRIDGE

(71) Applicant: Takao Hiraoka, Kanagawa (JP)

(72) Inventor: Takao Hiraoka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/186,003

(22) Filed: Jun. 17, 2016

(65) Prior Publication Data

US 2016/0297912 A1   Oct. 13, 2016

Related U.S. Application Data

(63) Continuation of application No. 14/397,998, filed as application No. PCT/JP2013/064423 on May 17, 2013, now Pat. No. 9,399,717.

(30) Foreign Application Priority Data

May 18, 2012 (JP) ................................. 2012-113970

(51) Int. Cl.
| | | |
|---|---|---|
| C09D 11/101 | (2014.01) |
| C08F 222/10 | (2006.01) |
| C09D 11/30 | (2014.01) |
| C09D 11/322 | (2014.01) |
| C09D 133/14 | (2006.01) |

(52) U.S. Cl.
CPC ...... *C08F 222/1006* (2013.01); *C09D 11/101* (2013.01); *C09D 11/30* (2013.01); *C09D 11/322* (2013.01); *C09D 133/14* (2013.01); *C08F 2222/1013* (2013.01)

(58) Field of Classification Search
CPC ...... C09D 11/101; C09D 11/30; C09D 11/322
See application file for complete search history.

(56) References Cited

U.S. PATENT DOCUMENTS

| | | |
|---|---|---|
| 5,266,441 A | 11/1993 | Kondo |
| 5,800,907 A | 9/1998 | Yumoto |
| 6,114,404 A | 9/2000 | Deeken |
| 6,399,267 B1 | 6/2002 | Nishimura |
| 7,544,264 B2 | 6/2009 | Tateishi |
| 8,740,374 B2 | 6/2014 | Seno |
| 9,399,717 B2 * | 7/2016 | Hiraoka ............... C09D 11/322 |
| 2004/0145639 A1 | 7/2004 | Noutary |
| 2004/0192070 A1 | 9/2004 | Tateishi |
| 2005/0045269 A1 | 3/2005 | Tateishi |
| 2005/0147919 A1 | 7/2005 | Kunz et al. |
| 2006/0093955 A1 | 5/2006 | Ohshima |
| 2008/0286484 A1 | 11/2008 | Tojo et al. |
| 2009/0056993 A1 | 3/2009 | Satou et al. |
| 2009/0110827 A1 | 4/2009 | Nakano et al. |
| 2012/0086762 A1 | 4/2012 | Noguchi et al. |
| 2012/0147103 A1 | 6/2012 | Hasegawa et al. |
| 2012/0176456 A1 | 7/2012 | Maekawa et al. |
| 2012/0200648 A1 | 8/2012 | Hiraoka et al. |
| 2012/0242768 A1 | 9/2012 | Seno et al. |
| 2012/0293589 A1 | 11/2012 | Hiraoka |
| 2013/0065024 A1 | 3/2013 | Aruga et al. |
| 2013/0321520 A1 | 12/2013 | Ito |
| 2014/0240414 A1 | 8/2014 | Hiraoka |
| 2015/0009265 A1 | 1/2015 | Kohzuki |

FOREIGN PATENT DOCUMENTS

| | | |
|---|---|---|
| EP | 2 028 241 A1 | 2/2009 |
| JP | 2004-526820 | 9/2004 |
| JP | 2005-290035 A | 10/2005 |
| JP | 3947754 | 4/2007 |
| JP | 2008-201876 | 9/2008 |
| JP | 2012-140593 | 7/2012 |
| JP | 2012-251123 | 12/2012 |
| RU | 2 301 117 C2 | 6/2007 |
| WO | WO 2012/153867 A1 | 11/2012 |
| WO | WO 2013/069580 A1 | 5/2013 |

OTHER PUBLICATIONS

International Search Report dated Aug. 20, 2013 in PCT/JP13/064423 filed on May 17, 2013.
Extended European Search Report dated Aug. 27, 2015 in Patent Application No. 13791632.6.
Russian Official Decision on Grant issued on Jan. 13, 2016 in Patent Application No. 2014151241/04(082067) with English translation.

* cited by examiner

*Primary Examiner* — Sanza McClendon
(74) *Attorney, Agent, or Firm* — Oblon, McClelland, Maier & Neustadt, L.L.P.

(57) ABSTRACT

A photopolymerizable composition, which includes a photoradical polymerization initiator and photopolymerizable monomers containing glycerol dimethacrylate, where an amount of the glycerol dimethacrylate in the photopolymerizable monomers is 25% by mass or greater, and pencil hardness of a cured product is F or harder, where the cured product is formed by curing a coating film through irradiation with light of a wavelength region corresponding to a UVA region, with a light to dose of 800 mJ/cm$^2$, where the coating film is formed by coating the photopolymerizable composition on a base so as to have an average thickness of 30 μm.

14 Claims, 1 Drawing Sheet

PHOTOPOLYMERIZABLE COMPOSITION, PHOTOPOLYMERIZABLE INKJET INK, AND INK CARTRIDGE

CROSS REFERENCE TO RELATED APPLICATION(S)

This application is a continuation of U.S. application Ser. No. 14/397,998, filed on Oct. 30, 2014, which is a national stage patent application of international patent application PCT/JP13/64423, filed on May 17, 2013, the text of which is incorporated by reference, and claims foreign priority to JP 2012-113970, filed on May 18, 2012, the entire content of which is incorporated herein by reference.

TECHNICAL FIELD

The present invention relates to a photopolymerizable composition, a photopolymerizable inkjet ink, and an ink cartridge housing the ink.

BACKGROUND ART

Photopolymerizable compositions and photopolymerizable inkjet inks using (meth)acrylic acid esters have been widely known (see PTL 1 etc.).

However, many of monomers used in conventional photopolymerizable compositions and photopolymerizable inkjet inks are toxic. Especially, most of (meth)acrylic acid esters, which are readily available with low cost, have high toxicity in terms of skin sensitivity, which causes allergy reactions with skin upon contact with them. Conventional art has not yet provided any solution to this problem.

Printing inks using glycerol dimethacrylate have been already known (see PTL 2).

However, there is not description therein about skin sensitization associated with glycerol dimethacrylate and other monomers used in combination.

CITATION LIST

Patent Literature

PTL 1: Japanese Patent Application Laid-Open (JP-A) No. 2004-526820
PTL 2: Japanese Patent (JP-B) No. 3947754

SUMMARY OF INVENTION

Technical Problem

The present invention aims to solve the aforementioned various problems in the art and to achieve the following object. An object of the present invention is to provide a photopolymerizable composition, which has no problem of skin sensitization, and provides a coating film having excellent film strength.

Solution to Problem

The means for solving the aforementioned problems is as follows,
The photopolymerizable composition of the present invention contains:
photopolymerizable monomers containing glycerol dimethacrylate, caprolactone-modified dipentaerythritol hexaacrylate, and diethylene glycol dimethacrylate,
wherein an amount of the glycerol dimethacrylate in the photopolymerizable monomers is 25% by mass or greater.

Advantageous Effects of Invention

The present invention can solve the aforementioned various problems in the art, achieve the aforementioned object, and can provide a photopolymerizable composition, which has no problem of skin sensitization, and provides a coating film having excellent film strength.

Moreover, printed matter obtained using the photopolymerizable composition of the present invention has no problem of skin sensitization even if an uncured monomer component is remained, and skin sensitization is not caused even when the printed matter is touched with hands or fingers. Accordingly, safe coated matter and printed matter can be provided.

Figure 1:
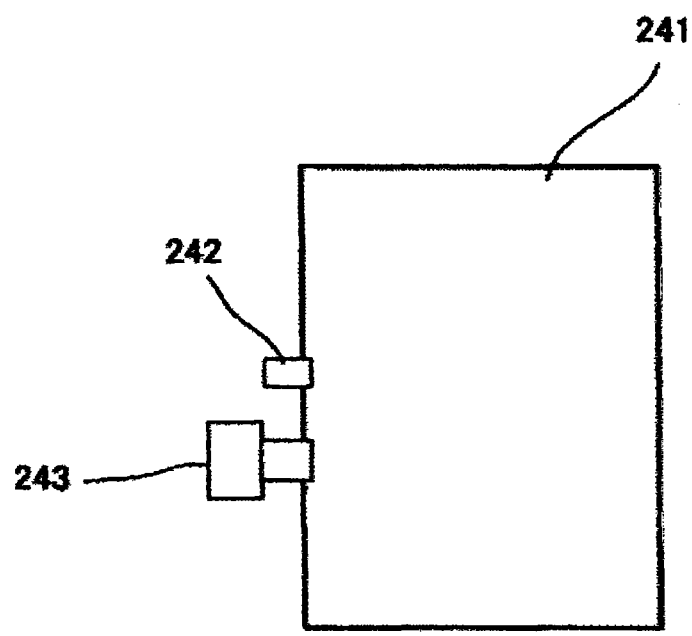
FIG. 1 is a schematic diagram illustrating one example of an ink bag of an ink cartridge.

DESCRIPTION OF EMBODIMENTS (Photopolymerizable Composition)
The photopolymerizable composition of the present invention contains at least photopolymerizable monomers, and may further contain other components, such as a photoradical polymerization initiator, a polymerization accelerator, and a colorant, if necessary.
<Photopolymerizable Monomers>
The photopolymerizable monomers contains at least glycerol dimethacrylate, caprolactone-modified dipentaerythritol hexaacrylate, and diethylene glycol dimethacrylate, which are negative for skin sensitization, and may further contain other photopolymerizable monomers, if necessary.
An amount of the glycerol dimethacrylate in the photopolymerizable monomers is 25% by mass or greater.
The present invention will be specifically explained hereinafter.
The present inventors have found that it is possible to provide a photopolymerizable composition, which can be ejected by inkjet, can be cured upon application of appropriate light, and can provide a coating film more solid than the one disclosed in Japanese Patent Application No. 2012-46301, when the photopolymerizable composition contains, as photopolymerizable monomers having a viscosity in the range, at which they can be ejected as inkjet, and being negative for skin sensitization, glycerol dimethacrylate, diethylene glycol dimethacrylate, and caprolactone-modified dipentaerythritol hexaacrylate, all of which has a very small SI value that indicates a level of the sensitization, i.e., 1.2 or lower, compared with methacrylate disclosed in Japanese Patent Application No. 2010-278177, and an amount of the glycerol dimethacrylate in the photopolymerizable monomer is 25% by mass or greater. Note that, the details of a SI value will be described later.

As a result of the studies conducted by the present inventors, they have found several (meth)acrylic acids and (meth)acryl amides, which do not have a problem of skin sensitization. As one example thereof, an inkjet ink using methacrylate, as a main component, is disclosed in Japanese Patent Application No. 2010-278177 based on the fact that methacrylate is low toxic in terms of skin sensitization compared to acrylate. However, to improve performances even further, it is desired that a level of skin sensitization is lowered, and a viscosity is lowered so as not to adversely affect ejection by inkjet even when the viscosity is increased by blending with various materials such as a pigment and additives.

Note that, reduction in the viscosity can be easily achieved by adding a diluting solvent, but use of a solvent is not desirable considering the environment, as the solvent is evaporated and released in the air. Moreover, a photopolymerizable aqueous inkjet ink containing water has been known in the art. As described later, however, it cannot be expected that this ink achieves desirable penetration and drying with a non-permeable base. Therefore, it is necessary to provide a step for evaporating water for accelerating processing speed or improving efficiency, for which a heat source is required. Therefore, such ink is not desirable in terms of energy saving.

To solve the problems descried above, the present inventors disclosed a photopolymerizable inkjet ink, which can provide a rigid coating film and have no problem of skin sensitization in Japanese Patent Application No. 2012-46301. However, for the purpose of protecting a surface of a housing or molded article, there is a need for resistance under more severe conditions and thus further improvement in more strength of a coating film than that disclosed in Japanese Patent Application No. 2012-46301 is desired.

Moreover, if a solid coating film is produced, not a pattern of a certain shape, not only inkjet printing, but methods such as spray coating and brush coating, can be used. However, it is difficult to obtain a highly solid coating film without a problem of skin sensitization.

A printing ink using glycerol dimethacrylate, which is one of (meth)acrylic esters having no problem of skin sensitization found by the present inventors, has been known in the art already (see JP-B No. 3947754).

In this disclosure, however, there is no description about skin sensitization of glycerol dimethacrylate and other monomers used in combination. Although details will be described later, when glycerol dimethacrylate is added to an ink in an amount of 10% by mass to 21% by mass, as disclosed in JP-B No. 3947754, as well as (meth)acrylic acid ester having no problem of skin sensitization found by the present inventors, a coating film strength does not improve more than the result disclosed in Japanese Patent Application No. 2012-46301.

Here, the photopolymerizable monomer negative for skin sensitization refers to a compound that satisfies at least one of the following skin sensitization evaluations (1) to (2).
(1) A compound having a Stimulation Index (SI value) of less than 3, where the Stimulation Index indicates the level of sensitization as measured by a skin sensitization test based on the LLNA (Local Lymph Node Assay).
(2) A compound evaluated as "negative for skin sensitization" or "no skin sensitization" in its material safety data sheet (MSDS).

Regarding the above (1), the compound having a SI value of less than 3 is considered negative for skin sensitization as described in literatures, for example, "Functional Material" (*Kino Zairyou*) 2005, September, Vol. 25, No. 9, p. 55. The lower SI value means lower skin sensitization. Thus, in the present invention, a monomer or an oligomer having lower SI value is preferably used. The SI value of the monomer used is preferably less than 3, more preferably 2 or lower, even more preferably 1.6 or lower.

When diethylene glycol dimethacrylate, caprolactone-modified dipentaerythritol hexaacrylate, and glycerol dimethacrylate, which are monomers negative for skin sensitization and readily available, are determined as Compound (A1), Compound (A2), and Compound (A3), respectively, amounts of Compound (A1) and Compound (A2) are appropriately adjusted, provided that an amount of Compound (A3) in the photopolymerizable monomer is 25% by mass or greater. It is preferred that the amount of Compound (A1) be 25% by mass to 70% by mass, the amount of Compound (A2) be 5% by mass to 50% by mass, and the amount of Compound (A3) be 25% by mass to 40% by mass. Moreover, it is more preferred in terms of no skin sensitization, excellent coating film strength, and ejection of inkjet that the amount of Compound (A1) be 25% by mass to 70% by mass, the amount of Compound (A2) be 5% by mass to 40% by mass, and the amount of Compound (A3) be 25% by mass to 40% by mass.

<<Other Photopolymerizable Monomers>>

The following (meth)acrylate, (meth)acryl amide, and vinyl ether, which may have a problem of skin sensitization as used alone, or which is a compound whose skin sensitization has not been confirmed, can be used as other photopolymerizable monomers, together with the aforementioned photopolymerizable monomers, provided that they do not adversely affect a resulting photopolymerizable composition.

Examples of other photopolymerizable monomers include ethylene glycol di(meth)acrylate, hydroxypivalic acid neopentyl glycol di(meth)acrylate, γ-butyrolactone acrylate, isobornyl (meth)acrylate, formulated trimethylol propane mono(meth)acrylate, polytetramethylene glycol di(meth)acrylate, trimethylol propane (meth)acrylic acid benzoate, diethylene glycol diacrylate, triethylene glycol di(meth)acrylate, tetraethylene glycol di(meth)acrylate, polyethylene glycol di(meth)acrylate [$CH_2=CH-CO-(OC_2H_4)_n$-$OCOCH=CH_2$ (n≈4)], [$CH_2=CH-CO-(OC_2H_4)_n$-$OCOCH=CH_2$ (n≈9)], [$CH_2=CH-CO-(OC_2H_4)_n$-$OCOCH=CH_2$ (n≈14)], [$CH_2=CH-CO-(OC_2H_4)_n$-$OCOCH=CH_2$ (n≈23)], dipropylene glycol di(meth)acrylate, tripropylene glycol di(meth)acrylate, polypropylene glycol dimethacrylate [$CH_2=C(CH_3)$-$CO-(OC_3H_6)_n$-$OCOC(CH_3)=CH_2$ (n≈7)], 1,3-dibutanediol diacrylate, 1,4-dibutanediol di(meth)acrylate, 1,6-hexanediol di(meth)acrylate, 1,9-nonanediol di(meth)acrylate, neopentyl glycol di(meth)acrylate, tricyclodecane dimethanol diacrylate, propylene oxide-modified bisphenol A di(meth)acrylate, dipentaerythritol hexa(meth)acrylate, (meth)acryloyl morpholine, 2-hydroxypropyl (meth)acryl amide, propylene oxide-modified tetramethylol methane tetra(meth)acrylate, dipentaerythritol hydroxypenta(meth)acrylate, caprolactone-modified dipentaerythritol hydroxypenta(meth)acrylate, ditrimethylol propane tetra(meth)acrylate, pentaerythritol tetra(meth)acrylate, trimethylol propane triacrylate, ethylene oxide-modified trimethylol propane triacrylate, propylene oxide-modified trimethylol propane tri(meth)acrylate, caprolactone-modified trimethylol propane tri(meth)acrylate, pentaerythritol tri(meth)acrylate, tris(2-hydroxyethyl)isocyanurate tri(meth)acrylate, ethoxylated neopentyl glycol di(meth)acrylate, propylene oxide-modified neopentylglycol di(meth)acrylate, propylene oxide-modified glyceryl tri(meth)acrylate, polyester di(meth)acrylate, polyester tri(meth)acrylate, polyester tetra(meth)acrylate, polyester penta(meth)acrylate, polyester poly(meth)acrylate, N-vinyl caprolactam, N-vinyl pyrrolidone, N-vinyl formamide, polyurethane di(meth)acrylate, polyurethane tri(meth)acrylate, polyurethane tetra(meth)acrylate, polyurethane penta(meth)acrylate, polyurethane poly(meth)acrylate, cyclohexane dimethanol divinyl ether, cyclohexane dimethanol monovinyl ether, hydroxyethyl vinyl ether, diethylene glycol monovinyl ether, diethylene glycol divinyl ether, dicyclopentadiene vinyl ether, tricyclodecane vinyl ether, benzyl vinyl ether, and ethyloxtacene methyl vinyl ether.

Examples of the vinyl ether negative for skin sensitization include, other than those listed above, triethylene glycol divinyl ether, hydroxybutyl vinyl ether, and ethylvinyl ether. Among them, triethylene glycol divinyl ether is preferable as its viscosity is sufficiently low, and a boiling point thereof is not excessively low, and thus it is easily handled at normal temperature and normal pressure. Other vinyl ethers can be also used, if necessary.

<Other Components>
<<Photoradical Polymerization Initiator>>

The ink of the present invention preferably contains a photoradical polymerization initiator. The photoradical polymerization initiator is not appropriately selected depending on the intended purpose without any limitation, but the photoradical polymerization initiator is preferably selected from those negative for skin sensitization.

The photoradical polymerization initiator negative for skin sensitization is appropriately selected depending on the intended purpose without any limitation, provided that it is compounds satisfying any of the skin sensitization evaluations (1) to (2), and examples thereof include 1-hydroxycyclohexylphenylketone, 2-dimethylamino-2-(4-methylbenzyl)-1-(4-morpholin-4-yl-phenyl) butan-1-one, and 2,4-diethyl thioxanthone. These may be used alone or in combination.

The (meth)acrylic acid ester, the (meth)acryl amide, and the vinyl ether are known to have cationic polymerization property as well. Photocationic polymerization initiators are generally expensive and generate a slight amount of a strong acid even in the state where they are not irradiated with light. Thus, it is necessary to take special cares such as imparting acid resistance to the ink supply channel of a printer, imposing limitation on the choice of the constituent members of the printer.

In contrast, the photopolymerizable composition of the present invention can use a photoradical polymerization initiator that is inexpensive and generates no strong acid. Thus it is possible to produce a photopolymerizable composition at ;pw cost, and also it is easy to select the constituting members of a printer.

Needless to say, when using quite high energy light source such as electron beams, α rays, β rays, γ rays or X rays, polymerization reaction proceeds without polymerization initiator. This is a conventionally known matter, and not described in detail in the present invention.

The photoradical polymerization initiator includes, for example, a self-cleaving photopolymerization initiator and a hydrogen-abstracting polymerization initiator.

Examples of the self-cleaving photopolymerization initiator include 2,2-dimethoxy-1,2-diphenylethan-1-one, 1-hydroxycyclohexyl phenyl ketone, 2-hydroxy-2-methyl-1-phenylpropan-1-one, 1-[4-(2-hydroxyethoxy)-phenyl]-2-hydroxy-2-methyl-1-propan-1-one, 2-hydroxy-1-{4-[4-(2-hydroxy-2-methylpropionyl)benzyl]phenyl}-2-methyl-1-propan-1-one, phenylglyoxylic acid methyl ester, 2-methyl-1-[4-(methylthio)phenyl]-2-morpholinopropan-1-one, 2-benzyl-2-dimethylamino-1-(4-morpholinophenyl)butanone-1,2-dimethylamino-2-(4-methylbenzyl)-1-(4-morpholin-4-yl-phenyl) butan-1-one, bis(2,4,6-trimethylbenzoyl)phenylphosphine oxide, bis(2,6-dimethoxybenzolyl)-2,4,4-trimethyl-pentylphosphine oxide, 2,4,6-trimethylbenzoylphosphine oxide, 1,2-octanedion-[4-(phenylthio)-2-(o-benzoyloxime)], ethanone-1-[9-ethyl-6-(2-methylbenzoyl)-9H-carbazol-3-yl]-1-(O-acetyloxime) and [4-(methylphenylthio)phenyl]phenylmethanone.

Examples of the hydrogen-abstracting polymerization initiator include: benzophenone compounds such as benzophenone, methylbenzophenone, methyl-2-benzoylbenzoate, 4-benzoyl-4'-methyldiphenyl sulfide and phenylbenzophenone; and thioxanthone compounds such as 2,4-diethylthioxanthone, 2-chlorothioxanthone, isopropylthioxanthone and 1-chloro-4-propylthioxanthone.

<<Polymerization Accelerator>>

Moreover, amine may be used as a polymerization accelerator in combination with the polymerization accelerator.

Examples of the polymerization accelerator include p-dimethylaminobenzoate, 2-ethylhexyl p-dimethylaminobenzoate, methyl p-dimethylaminobenzoate, 2-dimethylaminoethyl benzoate and butoxyethyl p-dimethylaminobenzoate.

<<Colorant>>

The photopolymerizable composition does not need to contain a colorant, but can contain a colorant, if necessary. The colorant is appropriately selected from conventional inorganic pigments, organic pigment, and various color pigments (e.g. a black pigment, a yellow pigment, a magenta pigment, a cyan pigment, and a white pigment) depending on the intended purpose without any limitation.

Examples of the black pigment include carbon black produced by a furnace method or a channel method.

Examples of the yellow pigment include pigments of Pigment Yellow series, such as Pigment Yellow 1, Pigment Yellow 2, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 75, Pigment Yellow 83, Pigment Yellow 93, Pigment Yellow 95, Pigment Yellow 97, Pigment Yellow 98, Pigment Yellow 114, Pigment Yellow 120, Pigment Yellow 128, Pigment Yellow 129, Pigment Yellow 138, Pigment Yellow 150, Pigment Yellow 151, Pigment Yellow 154, Pigment Yellow 155, and Pigment Yellow 180.

Examples of the magenta pigment include pigments of Pigment Red series, such as Pigment Red 5, Pigment Red 7, Pigment Red 12, Pigment Red 48(Ca), Pigment Red 48(Mn), Pigment Red 57(Ca), Pigment Red 57:1, Pigment Red 112, Pigment Red 122, Pigment Red 123, Pigment Red 168, Pigment Red 184, Pigment Red 202, and Pigment Violet 19.

Examples of the cyan pigment include pigment of Pigment Blue series, such as Pigment Blue 1, Pigment Blue 2, Pigment Blue 3, Pigment Blue 15, Pigment Blue 15:3, Pigment Blue 15:4, Pigment Blue 16, Pigment Blue 22, Pigment Blue 60, Vat Blue 4, and Vat Blue 60.

Examples of the white pigment include: sulfuric acid salts of alkaline earth metals such as barium sulfate; carbonic acid salts of alkaline earth metals such as calcium carbonate; silica such as fine silicic acid powder and synthetic silicic acid salts, calcium silicate; alumina; alumina hydrate; titanium oxide; zinc oxide; talc; and clay.

In addition, various inorganic or organic pigments may optionally be used considering, for example, physical properties of the photopolymerizable composition.

Further, polymerization inhibitor, a surfactant, and a pigment dispersing agent may be optionally used.

Examples of the polymerization inhibitor include 4-methoxy-1-naphthol, methylhydroquinone, hydroquinone, t-butylhydroquinone, di-t-butylhydroquinone, methoquinone, 2,2'-dihydroxy-3,3'-di(α-methylcyclohexyl)-5,5'-dimethyldiphenyl methane, p-benzoquinone, di-t-butylbutyl diphenylamine, 9,10-di-n-butoxyanthracene, 4,4'[1,10-dioxo-1,10-decandiylbis(oxy)]bis[2,2,6,6-tetramethyl]-1-piperidinyloxy.

Examples of the surfactant include higher fatty acid ester containing polyether, an amino group, a carboxyl group, or a hydroxyl group, a polydimethylsiloxane compound containing, in its side chain or terminal, polyether, an amino group, a carboxyl group, or a hydroxyl group, and a fluoroalkyl compound containing polyether, an amino group, a carboxyl group, and a hydroxyl group.

Examples of the pigment dispersing agent include a polar group-containing polymer compound.

(Inkjet Ink)

The inkjet ink (may referred to as an "ink" hereinafter) of the present invention contains the photopolymerizable composition of the present invention, and may further contain other component, if necessary.

The photopolymerizable composition of the present invention may be used as a coating agent for spray coating, or brush coating, or may be used as an inkjet ink.

The physical properties of the inkjet ink are appropriately selected depending on the intended purpose without any limitation, but they are desirably matched to the specifications required for an inkjet ejection head for use. Various ejection heads are on the marked from numerous manufacturers, and among them, there are ejection heads having a function of adjusting temperature over a wide temperature range. Considering such market trends, the viscosity of the ink at temperature of 25° C. is preferably 2 mPa·s to 150 mPa·s. In the case where the ink is ejected at 25° C., the viscosity of the ink is preferably 5 mPa·s to 18 mPa·s. As mentioned earlier, it is possible to use the temperature adjustment function of the ejection head. In the case where the viscosity of the ink is too high at 25° C., the viscosity thereof can be reduced by optionally heating the head. Assuming that the heating condition is 45° C. to 60° C., in the aforementioned case, the viscosity of the ink at 45° C. to 60° C. is preferably 2 mPa·s to 20 mPa·s, more preferably 5 mPa·s to 18 mPa·s.

Accordingly, the low viscosity of the ink can be achieved as long as the viscosity of the ink falls into either a range of 5 mPa·s to 18 mPa·s at 25° C., or a range of 2 mPa·s to 20 mPa·s at 45° C. to 60° C.

(Ink Cartridge)

The ink cartridge of the present invention contains the photopolymerizable inkjet ink of the present invention and a container, and may further contain other members, such as an ink bag, if necessary.

The ink of the present invention can be housed in a container, and used as an ink cartridge. With this form, users do not have to directly touch the ink during works such as exchange of the ink, and thus they are not concerned with staining of their fingers, hands or clothes. In addition, it is possible to prevent interfusion of foreign matter such as dust into the ink.

The container is not particularly limited, and the shape, structure, size and material thereof may be appropriately selected depending on the intended purpose. For example, the container is preferably selected from those having an ink bag formed of an aluminum laminate film, or a resin film.

Figure 2:
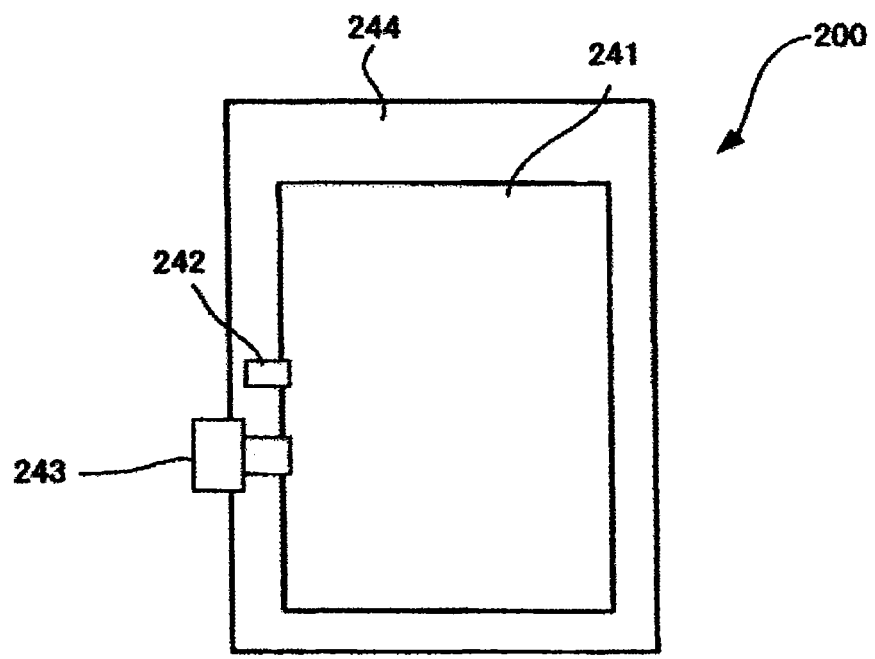
FIG. 2 is a schematic diagram illustrating one example of an ink cartridge housing an ink bag.

The ink cartridge will be described referring to FIGS. 1 and 2. FIG. 1 is a schematic diagram illustrating an example of an ink bag (241) of the ink cartridge of the present invention. FIG. 2 is a schematic diagram illustrating the ink cartridge (200) in which the ink bag (241) of FIG. 1 is housed in a cartridge case (244) that is one example of the container.

As illustrated in FIG. 1, the ink bag (241) is filled with the ink by injecting the ink from an ink inlet (242). After removal of air present inside the ink bag (241), the ink inlet (242) is sealed by fusion bonding. At the time of use, a needle attached to the main body of the device is inserted into an ink outlet (243) formed of a rubber member to supply the ink to the device therethrough. The ink bag (241) is formed of a wrapping member such as an air non-permeable aluminum laminate film. As illustrated in FIG. 2, the ink bag (241) is typically housed in a plastic cartridge case (244), which is then detachably mounted in use to various inkjet recording devices as the ink cartridge (200).

The ink cartridge of the present invention is preferably detachably mounted to inkjet recording devices. As a result of this, refill or exchange of the ink can be simplified, and workability can be improved.

A coating base (recording medium) is appropriately selected depending on the intended purpose without any limitation. Examples thereof include paper, plastic, metal ceramic, glass, and a composite material of the above-listed materials.

Since an absorbent base, such as wood free paper, can expect an effect of penetrating and drying, an aqueous ink or an oil ink, which is not a quick-drying ink, can be used for such base. On the other hand, it is practical to use a quick-drying ink for a non-absorbent base, such as gloss coat paper, a plastic film, a plastic molded article, ceramic, glass, and metal.

The photopolymerizable composition and inkjet ink of the present invention are cured immediately upon application of light, and thus can be used on the aforementioned non-absorbent base, as well as an absorbent base. Among the non-absorbent bases, the photopolymerizable composition and inkjet ink of the present invention are suitably used for a plastic film or plastic article formed of polyethylene, polypropylene, polyethylene terephthalate, an ABS resin, polyvinyl chloride, polystyrene, other polyesters, polyamide, vinyl-based materials, or a composite material thereof, but the base is not particularly limited.

EXAMPLES

The present invention will be concretely explained through Examples hereinafter, but Examples shall not be construed as to limit the scope of the present invention.

<Evaluation Method of SI Value>

According to the skin sensitization test based on the LLNA (Local Lymph Node Assay), the SI value was measured in the below described manner.

[Test Material]

<<Positive Control>>

α-Hexylcinnamaldehyde (HCA; product of Wako Pure Chemical Industries, Ltd.) was used as the positive control.

<<Vehicle>>

As a vehicle, a mixture containing acetone (product of Wako Pure Chemical Industries, Ltd.) and olive oil (product of Fudimi Pharmaceutical Co., Ltd.) in a volume ratio of 4/1 was used.

<<Animals used>>

Before treated with the test substances, the positive control or the vehicle control, female mice were acclimated for 8 days including 6-day quarantine. No abnormalities were found in all the animals during the quarantine/acclimation period. Based on the body weights measured 2 days before the initiation of sensitization, they were categorized into 2 groups (4 mice/group) by the body weight stratified random sampling method so that the body weight of each individual was within ±20% of the average body weight of all the individuals. Each animal was 8 weeks old to 9 weeks old at the time of the initiation of sensitization. The animals remaining after the categorization were excluded from the test.

The animals were individually identified by application of oil ink to their tale throughout the test period, and also their cages were labeled for identification.

<<Housing Environment>>

Throughout the housing period including the quarantine/acclimation period, the animals were housed in an animal room with barrier system, which was set as follows: 21° C. to 25° C. in temperature, 40% to 70% in relative humidity, 10 times/hour to 15 times/hour in frequency of air circulation, and 12 hours in light-dark cycle (lighting from 7:00 to 19:00).

The housing cages used were those made of polycarbonate, and four animals were housed in each cage.

The animals were given ad libitum solid diet for laboratory animals MF (product of Oriental Yeast Co., Ltd.). Also, using a water-supply bottle, they were given ad libitum tap water in which sodium hypochlorite (PURELOX, product of OYALOX Co., Ltd.) had been added so that the chlorine concentration was about 5 ppm. Bedding used was SUN-FLAKE (fir tree, shavings obtained with a power planer) (product of Charles River Inc.). The diet and feeding equipment were sterilized with an autoclave (121° C., 30 min) before use.

The cage and bedding were replaced with new ones at the times of the categorization and the removal of the auricular lymph node (i.e., the time when the animals were transferred from the animal room), and the water-supply bottle and rack were replaced with new ones at the time of the categorization.

[Test Method]

<<Group Composition>>

The group composition used for the measurement of the Si value is shown in Table 1.

TABLE 1

| Test group | Sensitization substance | Sensitization dose (μL/auricle) | Times of sensitization | Number of animals (animal No.) |
|---|---|---|---|---|
| Vehicle control group | Vehicle only | 25 | Once/day × 3 days | 4 (1-4) |
| Positive control group | 25.0% HCA | 25 | Once/day × 3 days | 4 (5-8) |

[Preparation]

<<Test Substance>>

Table 2 shows the amount of the test substance. The test substance was weighed in a measuring flask, and the volume of the test substance was adjusted to 1 mL with a vehicle. The thus-prepared solution was placed in a light-shielded airtight container (made of glass).

TABLE 2

| | Concentration after adjustment (w/v %) | Mass of test substance (g) |
|---|---|---|
| Test substance | 50.0 | 0.5 |

<<Positive Control Substance>>

About 0.25 g of HCA was accurately weighed, and a vehicle was added to the HCA to have the volume of 1 mL, to thereby prepare a 25.0 w/v % solution. The thus-prepared solution was placed in a light-shielded airtight container (made of glass).

<<BrdU>>

In a measuring flask, 200 mg of 5-bromo-2'-deoxyuridine (BrdU, product of NACALAI TESQUE, INC.) was accurately weighed. Then, physiological saline (product of OTSUKA PHARMACEUTICAL CO., LTD.) was added to the measuring flask, and dissolved through application of ultrasonic waves. The volume of the resultant solution was adjusted to 20 mL to prepare a 10 mg/mL solution (BrdU preparation). The thus-prepared solution was sterilized through filtration with a sterilized filtration filter and placed in a sterilized container.

<<Preparation Day and Storage Period>>

The positive control preparation was prepared on the day before the initiation of sensitization, and stored in a cold place except in use. The vehicle and the test substance preparations were prepared on the day of sensitization. The BrdU solution was prepared 2 days before administration and stored in a cold place until the day of administration.

Sensitization and Administration of BrdU]

<<Sensitization>>

Each (25 μL) of the test substance preparations, the positive control preparation and the vehicle was applied to both the auricles of each animal using a micropipetter. This treatment was performed once a day for three consecutive days.

<<Administration of BrdU>>

About 48 hours after the final sensitization, the BrdU preparation (0.5 mL) was intraperitoneally administered once to each animal.

[Observation and Examination]

<<General Conditions>>

All the animals used for the test were observed once or more times a day from the day of the initiation of sensitization to the day of the removal of the auricular lymph node (i.e., the day when the animals were transferred from the animal room). Notably, the observation day was counted from the day of the initiation of sensitization being regarded as Day 1.

<<Measurement of Body Weights>>

The body weight of each animal was measured on the day of the initiation of sensitization and on the day of the removal of the auricular lymph node (i.e., the day when the animals were transferred from the animal room). Also, the average of the body weights and the standard error thereof were calculated for each group.

<<Removal of Auricular Lymph Node and Measurement of Mass Thereof>>

About 24 hours after the administration of BrdU, the animals were allowed to undergo euthanasia, and their auricular lymph nodes were sampled. The surrounding tissue of each auricular lymph node was removed, and the auricular lymph nodes from both the auricles were collectively weighed. Also, the average of the weights of the auricular lymph nodes and the standard error thereof were calculated for each group. After the measurement of the weights, the auricular lymph nodes of each individual were stored in a frozen state using a BIO MEDICAL FREEZER set to −20° C.

<<Measurement of BrdU Intake>>

After returned to room temperature, the auricular lymph nodes were mashed with the gradual addition of physiological saline, and suspended therein. The thus-obtained suspension was filtrated and then dispensed into the wells of a 96-well microplate, with 3 wells being used per individual. The thus-dispensed suspensions were measured for intake of BrdU by the ELISA method. The reagents used were those of a commercially available kit (Cell Proliferation ELISA, BrdU colorimetric, Cat. No. 1647229, product of Roche Diagnostics Inc.). A multiplate reader (FLUOSTAR OPTIMA, product of BMG LABTECH Inc.) was used to measure the absorbance of each well (OD: 370 nm to 492 nm, the intake of BrdU), and the average of the absorbance of the 3 wells for each individual was used as the measurement of BrdU for the individual.

[Evaluation of Results]

<<Calculation of Stimulation Index (SI)>>

As shown in the following formula, the measurement of BrdU intake for each individual was divided by the average of the measurements of BrdU intake in the vehicle control group to calculate the SI value for the individual. The SI value of each test group was the average of the SI values of the individuals. Also, the standard error of the SI values was calculated for each test group. Notably, the SI value was rounded at the second decimal place and shown to the first decimal place.

$$SI = \frac{\text{Average of measurements of } BrdU \text{ intake for each individual (average of 3 wells)}}{\text{Average of measurements of } BrdU \text{ intake in the vehicle control group(average of 4 animals)}}$$

<Evaluation>

The photopolymerizable composition and ink of Example 1 were subjected to the measurements of the viscosity (mPa·s) at 25° C., 45° C., and 60° C., and the coating film strength. The results are presented in Table 3.

<<Viscosity>>

The viscosity at 25° C., 45° C., 60° C. were measured with a cone-plate-type rotary viscometer (product of TOKI SANGYO CO., LTD.) with the temperature of circulating water being constantly set to 25° C., 45° C. and 60° C. The temperature of 25° C. is temperature generally considered as room temperature. The temperature of 45° or 60° C. is temperature set considering the specification of a commercially available inkjet ejection head, such as GEN4 (product of Ricoh Printing Systems, Ltd.), that can be heated. In the case where low viscosity was achieved without heating up to 60° C., the measurement of the viscosity at 60° C. was omitted.

<<Coating Film Strength>>

The coating film strength was evaluated in the following manner. Specifically, onto a commercially available polycarbonate film (LUPILON E-2000, manufactured by Mitsubishi Engineering-Plastics Corporation, thickness: 100 μm), the photopolymerizable composition and the ink were applied by brush coating or inkjet printing. The applied photopolymerizable composition and the ink were cured by applying light at the light dose of 0.2 mW/cm$^2$ using a UV irradiating device $LH_6$ (product of Fusion Systems Japan Co., Ltd.). The resulting solid coating film was subjected to evaluation of scratch hardness in accordance with a pencil method as specified in JIS-K-5600-5-4. The pencil hardness includes 2H, H, F, HB, B, and 2B in this order from the hardest.

In the case where the viscosity of the photopolymerizable composition is excessively high, the photopolymerizable composition can be used as a coating agent, but cannot be used as an inkjet ink. As depicted in Table 3, the photopolymerizable compositions according to the present invention have variations in the values of the viscosity, but most of them can be also used as an inkjet ink.

As for handling of the inkjet ink, an aluminum pouch bag having a shape illustrated in FIG. 1 was charged with the ink, and hermetically sealed so as to avoid inclusion of air bubbles. The hermetically sealed pouch bag containing the ink was housed in a plastic cartridge as illustrated in FIG. 2. This cartridge was mounted to a casing adapted for housing it. In the casing, an ink flow channel was provided from the cartridge to a GEN4 head (product of Ricoh Printing Systems, Ltd.). The ink was jetted through the ink flow channel to form, on the film, a solid coating film.

In both of a case of brush coating and a case of inkjet printing, the conditions were adjusted so that a solid coating film have the average thickness of about 30 μm. The resulting solid coating film was irradiated with light of the wavelength region corresponding to the UVA region, with the light dose being each of 400 (mJ/cm$^2$), 800 (mJ/cm$^2$), and 1,200 (mJ/cm$^2$), to thereby cure the solid coating film. The resulting coating film was provided for the coating film strength evaluation (the same in other examples).

Example 1

As depicted in Table 3, 65 parts of Component A1 [diethylene glycol dimethacrylate ("2G" manufactured by Shin-Nakamura Chemical Co., Ltd.)], 10 parts of Component A2 component [caprolactone-modified dipentaerythritol hexaacrylate ("DPCA-60" manufactured by NIPPON KAYAKU Co., Ltd.)], 25 parts of Component A3 [glycerol dimethacrylate ("701" manufactured by Shin-Nakamura Chemical Co., Ltd.)], and 15 parts of Component B1 [1-hydroxy-cyclohexylphenylketone] as a photopolymerization initiator were used to thereby prepare a photopolymerizable composition and an inkjet ink of Example 1.

In the case where the photopolymerizable composition and ink were applied by brush coating, they were used as they were. As the inkjet ink, they were handled in the following manner. An aluminum pouch bag having a shape illustrated in FIG. 1 was charged with the ink, and hermetically sealed so as to avoid inclusion of air bubbles. The hermetically sealed pouch bag containing the ink was housed in a plastic cartridge as illustrated in FIG. 2. This cartridge was mounted to a casing adapted for housing it. In the casing, an ink flow channel was provided from the cartridge to a GEN4 head (product of Ricoh Printing Systems, Ltd.). The ink was jetted on a recording medium (LUPILON E-2000, manufactured by Mitsubishi Engineering-Plastics Corporation, thickness: 100 μm) through the ink flow channel at the ejection temperature of 60° C. to form a solid coating film. The conditions were adjusted so that the solid coating film had the average thickness of about 30 μm. In both cases of the brush coating and inkjet printing, the conditions were adjusted so that the solid coating film had the average thickness of about 30 μm. In the predetermined method, the prepared solid coating film was irradiated to light of the wavelength region corresponding to the UVA region, with the light dose being each of 400 (mJ/cm$^2$), 800 (mJ/cm$^2$), and 1,200 (mJ/cm$^2$), to thereby cure the solid coating film. The resulting coating film was provided for the coating film strength evaluation (the same in each of Examples and Comparative Examples).

In each of Examples and Comparative Examples, all the materials were mixed with the blending ratio (value was represented by parts by mass) presented in each column for Examples in Table 3, to thereby obtain a photopolymerizable composition.

Note that, where are a case where one photopolymerizable composition can be used as a coating agent for brush coating and also as an inkjet ink, and a case where a photopolymerizable composition can be used only as a coating agent, which are also depicted in Table 3.

Example 2

Coating film strength was evaluated in the same manner as in Example 1, provided that raw materials of an ink, such as the (meth)acrylate monomer component, and the polymerization initiator, were changed to those depicted in Table 3 to prepare a photopolymerizable composition and ink of Example 2 as depicted in Table 3. The results are presented in Table 3.

Example 3

Coating film strength was evaluated in the same manner as in Example 1, provided that raw materials of an ink, such as the (meth)acrylate monomer component, and the polymerization initiator, were changed to those depicted in Table 3 to prepare a photopolymerizable composition and ink of Example 3 as depicted in Table 3. The results are presented in Table 3.

Example 4

Coating film strength was evaluated in the same manner as in Example 1, provided that raw materials of an ink, such as the (meth)acrylate monomer component, and the polymerization initiator, were changed to those depicted in Table 3 to prepare a photopolymerizable composition and ink of Example 4 as depicted in Table 3. The results are presented in Table 3.

Example 5

Coating film strength was evaluated in the same manner as in Example 1, provided that raw materials of an ink, such as the (meth)acrylate monomer component, and the polymerization initiator, were changed to those depicted in Table 3 to prepare a photopolymerizable composition and ink of Example 5 as depicted in Table 3. The results are presented in Table 3.

Example 6

Coating film strength was evaluated in the same manner as in Example 1, provided that raw materials of an ink, such as the (meth)acrylate monomer component, and the polymerization initiator, were changed to those depicted in Table 3 to prepare a photopolymerizable composition and ink of Example 6 as depicted in Table 3. The results are presented in Table 3.

Example 7

Coating film strength was evaluated in the same manner as in Example 1, provided that raw materials of an ink, such as the (meth)acrylate monomer component, and the polymerization initiator, were changed to those depicted in Table 3 to prepare a photopolymerizable composition and ink of Example 7 as depicted in Table 3. The results are presented in Table 3. is Example 8

Coating film strength was evaluated in the same manner as in Example 1, provided that raw materials of an ink, such as the (meth)acrylate monomer component, and the polymerization initiator, were changed to those depicted in Table 3 to prepare a photopolymerizable composition and ink of Example 8 as depicted in Table 3. The results are presented in Table 3.

Comparative Example 1

Coating film strength was evaluated in the same manner as in Example 1, provided that raw materials of an ink, such as the (meth)acrylate monomer component, and the polymerization initiator, were changed to those depicted in Table 3 to prepare a photopolymerizable composition and ink of Comparative Example 1 as depicted in Table 3. The results are presented in Table 3.

Comparative Example 2

Coating film strength was evaluated in the same manner as in Example 1, provided that raw materials of an ink, such as the (meth)acrylate monomer component, and the polymerization initiator, were changed to those depicted in Table 3 to prepare a photopolymerizable composition and ink of Comparative Example 2 as depicted in Table 3. The results are presented in Table 3.

Comparative Example 3

Coating film strength was evaluated in the same manner as in Example 1, provided that raw materials of an ink, such as the (meth)acrylate monomer component, and the polymerization initiator, were changed to those depicted in Table 3 to prepare a photopolymerizable composition and ink of Comparative Example 3 as depicted in Table 3. The results are presented in Table 3.

Comparative Example 4

Coating film strength was evaluated in the same manner as in Example 1, provided that raw materials of an ink, such as the (meth)acrylate monomer component, and the polymerization initiator, were changed to those depicted in Table 3 to prepare a photopolymerizable composition and ink of Comparative Example 4 as depicted in Table 3. The results are presented in Table 3.

Comparative Example 5

Coating film strength was evaluated in the same manner as in Example 1, provided that raw materials of an ink, such as the (meth)acrylate monomer component, and the polymerization initiator, were changed to those depicted in Table 3 to prepare a photopolymerizable composition and ink of Comparative Example 5 as depicted in Table 3. The results are presented in Table 3.

The details of A1 to A3 and B1 to B3 in Table 3 are as follows. The value in parentheses after each product name is "SI value" as measured by the LLNA test described in the above skin sensitization evaluation (1). The description "no skin sensitization" or "negative for skin sensitization" after each product name means that the product is evaluated as "no skin sensitization" or "negative for skin sensitization" in the MSDS (Material Safety Data Sheet) described in the above skin is sensitization evaluation (2).

A1: diethylene glycol dimethacrylate, 2G (1.1), manufactured by Shin-Nakamura Chemical Co., Ltd.

A2: caprolactone-modified dipentaerythritol hexaacrylate, DPCA-60 (negative for skin sensitization, evaluated in MSDS, test method: OECD test guideline 406) manufactured by NIPPON KAYAKU Co., Ltd.

A3: glycerol dimethacrylate, 701 (1.2), manufactured by Shin-Nakamura Chemical Co., Ltd.

As a comparative compound, the following A4 was used.

A4: ethylene oxide-modified trimethylol propane trimethacrylate, TMPT-3EO (1.0), manufactured by Shin-Nakamura Chemical Co., Ltd.

[Polymerization Initiator and Polymerization Accelerator]

B1: 1-hydroxy-cyclohexylphenylketone, IRGACURE 184 (no skin sensitization, evaluated in MSDS, test method: OECD test guideline 406)), manufactured by BASF B2: 2-dimethylamino-2-(4-methylbenzyl)-1-(4-morpholin-4-yl-phenyl)butan-1-one, IRGACURE 379 (no skin sensitization, evaluated in MSDS, test method: OECD test guideline 406), manufactured by BASF B3: an equimolar mixture of 2,4-diethyl thioxanthone, KAYACURE DETX-S(1.4), manufactured by NIPPON KAYAKU Co., Ltd., and 2-dimethylhexyl p-dimethylaminobenzoate, ESCALOL 507 (no skin sensitization, evaluated in MSDS, test method: OECD test guideline 406), manufactured by ISP Japan

FIG. 3-2

|   |   | Comp. Ex. 1 | Comp. Ex. 2 | Comp. Ex. 3 | Comp. Ex. 4 | Comp. Ex. 5 |
|---|---|---|---|---|---|---|
| A | A1 | 75 | 75 | 70 | 70 | 65 |
|   | A2 | 10 | 10 | 10 | 10 | 10 |
|   | A3 |    | 15 |    | 20 |    |
|   | A4 | 15 |    | 20 |    | 25 |
| B | B1 | 15 | 15 | 15 | 15 | 15 |
|   | B2 |    |    |    |    |    |
|   | B3 |    |    |    |    |    |
|   | Carbon black *1 |   |   |   |   |   |
| Brush coating | Coating film strength (400 mJ/cm$^2$) | *3 | *3 | *3 | *3 | *3 |
|   | Coating film strength (800 mJ/cm$^2$) | B | B | HB | HB | HB |
|   | Coating film strength (1,200 mJ/cm$^2$) | F | F | H | H | H |
|   | Viscosity at 25° C. | 13 | 13 | 14 | 14 | 15 |
|   | Viscosity at 45° C. | 7 | 7 | 7 | 7 | 8 |
|   | Viscosity at 60° C. | *2 | *2 | *2 | *2 | *2 |
| Inkjet printing | Set temp. of ejection head | 45° C. | 45° C. | 45° C. | 45° C. | 45° C. |
|   | Coating film strength (400 mJ/cm$^2$) | *3 | *3 | *3 | *3 | *3 |
|   | Coating film strength (800 mJ/cm$^2$) | B | B | HB | HB | HB |

TABLE 3-1

|   |   | Ex. 1 | Ex. 2 | Ex. 3 | Ex. 4 | Ex. 5 | Ex. 6 | Ex. 7 | Ex. 8 |
|---|---|---|---|---|---|---|---|---|---|
| A | A1 | 65 | 50 | 37.5 | 37.5 | 25 | 50 | 50 | 50 |
|   | A2 | 10 | 25 | 37.5 | 37.5 | 50 | 10 | 10 | 10 |
|   | A3 | 25 | 25 | 25 | 25 | 25 | 40 | 40 | 40 |
|   | A4 |   |   |   |   |   |   |   |   |
| B | B1 | 15 | 15 | 15 | 10 | 10 | 15 |   | 15 |
|   | B2 |   |   |   |   |   |   | 15 |   |
|   | B3 |   |   |   |   |   |   |   | 10 |
|   | Carbon black *1 |   |   |   |   |   |   | 3 | 3 |
| Brush coating | Coating film strength (400 mJ/cm$^2$) | *3 | 2B | HB | *3 | F | *3 | *3 | *3 |
|   | Coating film strength (800 mJ/cm$^2$) | F | H | H | H | H | F | B | 2B |
|   | Coating film strength (1,200 mJ/cm$^2$) | H | H | 2H | 2H | H | H | F | HB |
|   | Viscosity at 25° C. | 15 | 38 | 60 | 52 | 110 | 24 | 30 | 27 |
|   | Viscosity at 45° C. | 7 | 19 | 35 | 30 | 58 | 11 | 13 | 12 |
|   | Viscosity at 60° C. | *2 | 7 | 13 | 12 | 21 | *2 | *2 | *2 |
| Inkjet printing | Set temp. of ejection head | 45° C. | 60° C. | 60° C. | 60° C. | *4 | 45° C. | 45° C. | 45° C. |
|   | Coating film strength (400 mJ/cm$^2$) | *3 | 2B | HB | *3 | *4 | *3 | *3 | *3 |
|   | Coating film strength (800 mJ/cm$^2$) | F | H | H | H | *4 | F | B | 2B |
|   | Coating film strength (1,200 mJ/cm$^2$) | H | H | 2H | 2H | *4 | H | F | HB |

-continued

FIG. 3-2

|  | Comp. Ex. 1 | Comp. Ex. 2 | Comp. Ex. 3 | Comp. Ex. 4 | Comp. Ex. 5 |
|---|---|---|---|---|---|
| Coating film strength (1,200 mJ/cm$^2$) | F | F | H | H | H |

In Tables 3-1 and 3-2, *1 denotes carbon black "#10" manufactured by Mitsubishi Chemical Corporation blended with a dispersing agent "SOLSPERSE 32000" manufactured by Lubrizol Japan Co. are blended in the weight ratio of 3/1; *2 denotes that the ink could be ejected at the temperature lower than the described temperature and thus the measurement of the viscosity was not performed; *3 denotes that the coating film was uncured (liquid remained or being tacky); and *4 denotes that it had high viscosity and could not be ejected by inkjet.

As in Comparative Examples 1 and 2, or Comparative Examples 3 and 4, even when glycerol dimethacrylate was used instead of ethylene oxide-modified trimethylol propane trimethacrylate, there were no change particularly in viscosity and coating film strength, unless the amount of glycerol dimethacrylate in the photopolymerizable monomer reached 25% by mass. Comparing Comparative Example 5 and Example 1, Example 1, in which the amount of glycerol dimethacrylate was 25% by mass, improved the coating film strength.

Moreover, as in Example 6, when the amount of glycerol dimethacrylate (A3) was increased, similarly to Example 1, the coating film strength was improved more than Comparative Example 5. Further, it was found from Examples 1, 2 and 3 that when the amount of glycerol dimethacrylate (A3) was 25% by mass or greater, a coating film whose strength was improved or had a certain strength with less light dose could be obtained by adjusting the amount of diethylene glycol dimethacrylate (A1) and the amount of caprolactone-modified dipentaerythritol hexaacrylate (A2).

It was confirmed from the above that the three-component monomers including glycerol dimethacrylate, caprolactone-modified dipentaerythritol hexaacrylate, and diethylene glycol dimethacrylate could improve the coating film strength more than the three-component monomers including ethylene oxide-modified trimethylol propane trimethacrylate, caprolactone-modified dipentaerythritol hexaacrylate, and diethylene glycol dimethacrylate disclosed Japanese Patent Application No. 2012-46301 when the amount of glycerol dimethacrylate in the photopolymerizable monomer was 25% by mass or greater.

It was confirmed from Examples 3 and 4 that the coating film strength was not lowered at a certain level or more of the light does, even when the amount of the polymerization initiator was reduced. Since the polymerization initiator is more expensive than the monomers, it is possible to save a cost of the photopolymerizable composition.

Moreover, although it is not presented in the table, Comparative Examples 4 and 5 and Examples 1 and 6 were subjected to a function evaluation of odor of a coating film. Odor of the coating films of Comparative Examples 4 and 5 and Examples 1 and 6 were compared with that of the coating films of Comparative Examples 4 and 5 and Examples 1 and 6 in each of which the polymerization initiator was increased to 20 parts by mass with the identical monomer composition, and that of the coating films of Comparative Examples 4 and 5 and Examples 1 and 6 in each of which the film was cured with the light dose of 800 mJ/cm$^2$ and 1,200 mJ/cm$^2$. As a result, it was confirmed that the coating films of Comparative Examples 4 and 5 and Examples 1 and 6, in each which the amount of the polymerization initiator was 15 parts by mass, reduced odor distinctive to the polymerization initiator under any curing conditions.

Similarly, it was confirmed from comparison between Example 3 and Comparative Example 4 that very slight odor distinctive to the polymerization initiator was felt from the coating film of Example 4, in which the amount of the polymerization initiator was reduced, and it was effective to adjust the amount of glycerol dimethacrylate in the photopolymerizable monomer to 25% by mass or greater for reduction in odor of the coating film.

Since the photopolymerizable composition of Example 5 had high viscosity, it was evaluated only as a coating agent. However, it was confirmed that the coating film strength could be improved with application of less light dose by adjusting blending ratio of three components of glycerol dimethacrylate, caprolactone-modified dipentaerythritol hexaacrylate, and diethylene glycol dimethacrylate.

It was confirmed from Examples 6, 7 and 8 that a coating film of certain strength could be obtained by using 2-dimethylamino-2-(4-methylbenzyl)-1-(4-morpholin-4-yl-phenyl) butan-1-one (B2) as a photoradical polymerization initiator even when a pigment was contained, although the strength of the coating film containing the pigment was less than that of the coating film that did not contain the pigment.

In all Comparative Examples and Examples exclusive of Example 5, solid coating films were produced by two methods including brush coating and inkjet printing, but the coating film strength did not change depending on the production method. Accordingly, a suitably method for producing a coating film can be selected depending on a requirement.

The embodiments of the present invention are as follows:
<1> A photopolymerizable composition, including:
photopolymerizable monomers containing glycerol dimethacrylate, caprolactone-modified dipentaerythritol hexaacrylate, and diethylene glycol dimethacrylate,
wherein an amount of the glycerol dimethacrylate in the photopolymerizable monomers is 25% by mass or greater.

<2> The photopolymerizable composition according to <1>, wherein the amount of the glycerol dimethacrylate in the photopolymerizable monomers is 25% by mass to 40% by mass, an amount of the caprolactone-modified dipentaerythritol hexaacrylate in the photopolymerizable monomers is 5% by mass to 50% by mass, and an amount of the diethylene glycol dimethacrylate in the photopolymerizable monomers is 25% by mass to 70% by mass.

<3> The photopolymerizable composition according to <2>, wherein the amount of the caprolactone-modified dipentaerythritol hexaacrylate in the photopolymerizable monomers is 5% by mass to 40% by mass.

<4> The photopolymerizable composition according to any one of <1> to <3>, further including a photoradical polymerization initiator.

<5> The photopolymerizable composition according to <4>, wherein the photoradical polymerization initiator is 1-hydroxy-cyclohexylphenylketone, 2-dimethylamino-2-(4-methylbenzyl)-1-(4-morpholin-4-yl-phenyl) butan-1-one, 2,4-diethyl thioxanthone, or any combination thereof.

<6> The photopolymerizable composition according to any one of <1> to <5>, further including a colorant.

<7> An inkjet ink, including:
the photopolymerizable composition according to any one of <1> to <6>.
<8> An ink cartridge, including:
the photopolymerizable inkjet ink according to <7>; and
a container,
wherein the photopolymerizable inkjet ink is housed in the container.

REFERENCE SIGNS LIST

200: ink cartridge
241: ink bag
242: ink inlet
243: ink outlet
244: cartridge case

The invention claimed is:

1. A photopolymerizable composition, comprising:
photopolymerizable monomers; and
a photoradical polymerization initiator,
wherein the photopolymerizable monomers comprise glycerol dimethacrylate,
wherein an amount of the glycerol dimethacrylate in the photopolymerizable monomers is 25% by mass or greater, and
wherein pencil hardness of a cured product is F or harder, where the cured product is formed by curing a coating film through irradiation with light of a wavelength region corresponding to a UVA region, with a light dose of 800 mJ/cm$^2$, where the coating film is formed by coating the photopolymerizable composition on a base so as to have an average thickness of 30 μm.

2. A photopolymerizable composition, comprising:
photopolymerizable monomers; and
a photoradical polymerization initiator,
wherein the photopolymerizable monomers comprise glycerol dimethacrylate,
wherein an amount of the glycerol dimethacrylate in the photopolymerizable monomers is 25% by mass or greater, and
wherein the photoradical polymerization initiator comprises 1-hydroxy-cyclohexylphenylketone.

3. The photopolymerizable composition according to claim 1, wherein the photopolymerizable monomers comprise at least one selected from the group consisting of caprolactone-modified dipentaerythritol hexaacrylate and diethylene glycol dimethacrylate.

4. The photopolymerizable composition according to claim 1, wherein the amount of the glycerol dimethacrylate in the photopolymerizable monomers is 25% by mass or greater but 40% by mass or less.

5. The photopolymerizable composition according to claim 1, wherein the photopolymerizable monomers have Stimulation Index (SI value) of less than 3 as measured by a skin sensitization test according to LLNA method (Local Lymph Node Assay) of the photopolymerizable monomers.

6. The photopolymerizable composition according to claim 1, wherein an amount of the photoradical polymerization initiator is 15 parts by mass or less relative to 100 parts by mass of the photopolymerizable monomers.

7. The photopolymerizable composition according to claim 6, wherein odor distinctive to the photoradical polymerization initiator is reduced.

8. The photopolymerizable composition according to claim 1, further comprising a colorant.

9. A photopolymerizable inkjet ink, comprising: the photopolymerizable composition according to claim 1.

10. A photopolymerizable inkjet ink, comprising: the photopolymerizable composition according to claim 2.

11. The photopolymerizable inkjet ink according to claim 9, wherein the photopolymerizable inkjet ink has a viscosity of 5 mPa·s to 18 mPa·s at 25° C., and 2 mPa·s to 20 mPa·s at 45° C. to 60° C.

12. An ink stored container, comprising:
a container; and
a photopolymerizable inkjet ink stored in the container,
wherein the photopolymerizable inkjet ink comprises:
photopolymerizable monomers; and
a photoradical polymerization initiator,
wherein the photopolymerizable monomers comprise glycerol dimethacrylate,
wherein an amount of the glycerol dimethacrylate in the photopolymerizable monomers is 25% by mass or greater, and
wherein pencil hardness of a cured product is F or harder, where the cured product is formed by curing a coating film through irradiation with light of a wavelength region corresponding to a UVA region, with a light dose of 800 mJ/cm$^2$, where the coating film is formed by coating the photopolymerizable inkjet ink on a base so as to have an average thickness of 30 μm.

13. An inkjet discharging device, comprising:
the ink stored container according to claim 12.

14. A cured product, comprising:
the photopolymerizable composition according to claim 1,
wherein the cured product is formed by curing the photopolymerizable composition.

* * * * *